US011140709B1

(12) United States Patent
Ram et al.

(10) Patent No.: US 11,140,709 B1
(45) Date of Patent: Oct. 5, 2021

(54) COOPERATIVE COMMUNICATION BY ACCESS POINTS IN A WLAN

(71) Applicant: NXP USA, Inc., Austin, TX (US)

(72) Inventors: B Hari Ram, Chennai (IN); Nilesh N. Khude, Pune (IN); Sri Varsha Rottela, Visakhapatnam (IN); Vijay Ahirwar, Pune (IN); Sudhir Srinivasa, Los Gatos, CA (US)

(73) Assignee: NXP USA, Inc., Austin, TX (US)

( * ) Notice: Subject to any disclaimer, the term of this patent is extended or adjusted under 35 U.S.C. 154(b) by 55 days.

(21) Appl. No.: 16/703,894

(22) Filed: Dec. 5, 2019

Related U.S. Application Data

(60) Provisional application No. 62/778,645, filed on Dec. 12, 2018.

(51) Int. Cl.
| | |
|---|---|
| *H04W 74/00* | (2009.01) |
| *H04W 16/28* | (2009.01) |
| *H04W 84/12* | (2009.01) |
| *H04W 74/08* | (2009.01) |
| *H04W 88/08* | (2009.01) |
| *H04B 7/0417* | (2017.01) |
| *H04B 7/0452* | (2017.01) |

(52) U.S. Cl.
CPC ........ *H04W 74/006* (2013.01); *H04B 7/0417* (2013.01); *H04B 7/0452* (2013.01); *H04W 16/28* (2013.01); *H04W 74/0816* (2013.01); *H04W 84/12* (2013.01); *H04W 88/08* (2013.01)

(58) Field of Classification Search
CPC ... H04W 74/006; H04W 16/28; H04W 84/12; H04W 74/0816; H04W 88/08; H04B 7/0417; H04B 7/0452
See application file for complete search history.

(56) References Cited

U.S. PATENT DOCUMENTS

| | | | |
|---|---|---|---|
| 8,457,236 | B2 | 6/2013 | Gomadam et al. |
| 8,543,063 | B2 | 9/2013 | Bergel et al. |
| 9,124,327 | B2 | 9/2015 | Gomadam et al. |
| 9,306,645 | B2 | 4/2016 | Zhang |

(Continued)

FOREIGN PATENT DOCUMENTS

WO 2018093132 A1 5/2018

OTHER PUBLICATIONS

IEEE Std 802.11™—2016 specification, IEEE Standard for Information technology—Telecommunications and Information exchange between systems Local and metropolitan area networks—Specific requirements,Part 11: Wireless LAN Medium Access Control (MAC) and Physical Layer (PHY) Specifications, section 9.3.1.8, pp. 1-6, year 2016.

(Continued)

*Primary Examiner* — Omar J Ghowrwal

(57) ABSTRACT

A method for communication in a wireless local area network (WLAN) includes receiving, at first and second access points (APs) in the WLAN, uplink signals from a first client station (STA), which is associated with a basic service set (BSS) of the first AP. First downlink signals are transmitted from the first AP to the first STA using a first steering matrix. Responsively to the received uplink signals, a second steering matrix is computed, having a null in a direction of the first STA. Second downlink signals are transmitted from the second AP to a second STA in the WLAN using the second steering matrix.

12 Claims, 3 Drawing Sheets

(56) References Cited

U.S. PATENT DOCUMENTS

| | | | |
|---|---|---|---|
| 9,307,523 | B2 | 4/2016 | Gomadam |
| 10,805,892 | B2 | 10/2020 | Ram et al. |
| 10,993,197 | B2 | 4/2021 | Ram et al. |
| 2014/0241240 | A1* | 8/2014 | Kloper .................. H04B 7/024 370/328 |
| 2014/0362840 | A1 | 12/2014 | Wong et al. |
| 2015/0295629 | A1 | 10/2015 | Xia et al. |
| 2019/0045366 | A1* | 2/2019 | Vermani .............. H04W 16/10 |
| 2019/0104547 | A1* | 4/2019 | Xue .................... H04B 7/0617 |
| 2019/0341988 | A1* | 11/2019 | Schelstraete ......... H04B 7/0626 |
| 2019/0373569 | A1* | 12/2019 | Ram .................... H04B 7/0417 |
| 2020/0059808 | A1* | 2/2020 | Lim .................... H04B 7/0417 |

OTHER PUBLICATIONS

IEEE P802.11ax™/D3.3, IEEE Draft Standard for Information Technology—Telecommunications and Information Exchange Between Systems Local and Metropolitan Area Networks—Specific Requirements, Part 11: Wireless LAN Medium Access Control (MAC) and Physical Layer (PHY) Specifications, Amendment 1 : Enhancements for High Efficiency WLAN, pp. 1-730, Dec. 2018.

IEEE Standard 802.11ac, "IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz", pp. 1-425, Dec. 2013.

International Application # PCT/IB2019/054429 search report dated Nov. 21, 2019.

Ram et al., U.S. Appl. No. 16/424,532, filed May 29, 2019.

Ram et al., U.S. Appl. No. 16/510,992, filed Jul. 15, 2019.

IEEE Standard 802.11n, "IEEE Standard for Information Technology—Telecommunications and Information Exchange Between Systems—Local and Metropolitan Area Networks—Specific Requirements; Part 11: Wireless LAN Medium Access Control (MAC) and Physical Layer (PHY) Specifications; Amendment 5: Enhancements for Higher Throughput", pp. 1-536, Oct. 29, 2009.

* cited by examiner

COOPERATIVE COMMUNICATION BY ACCESS POINTS IN A WLAN

CROSS-REFERENCE TO RELATED APPLICATION

This application claims the benefit of U.S. Provisional Patent Application 62/778,645, filed Dec. 12, 2018, which is incorporated herein by reference.

FIELD OF THE INVENTION

The present invention relates generally to communication networks, and particularly to apparatus and methods for spatial multiplexing of communications between access points and client stations.

BACKGROUND

Various communication systems use beamforming techniques for directional transmission and reception. Beamforming techniques for Wireless Local-Area Networks (WLANs) are specified, for example, in the IEEE P802.11ax™/D3.3 draft standard, entitled "Draft Standard for Information technology; Telecommunications and information exchange between systems Local and metropolitan area networks; Specific requirements; Part 11: Wireless LAN Medium Access Control (MAC) and Physical Layer (PHY) Specifications; Amendment 1: Enhancements for High Efficiency WLAN," December, 2018, which is incorporated herein by reference. This standard is also referred to herein as "IEEE 802.11ax" for brevity.

U.S. Pat. No. 9,306,645, whose disclosure is incorporated herein by reference, describes techniques for interference avoidance beamforming transmission. A described technique includes accessing, at a first device, data for transmission to a second device; performing, at the first device, a channel sounding process with a third device to obtain channel feedback regarding a wireless channel between the first device and the third device; determining a steering matrix based on the channel feedback to reduce interference leakage received by the third device during a beamforming transmission from the first device to the second device; and performing, at the first device, the beamforming transmission to the second device based on the data and the steering matrix.

SUMMARY

Embodiments of the present invention that are described hereinbelow provide methods and systems for improving the utilization of communication resources in a WLAN.

There is therefore provided, in accordance with an embodiment of the invention, a method for communication in a wireless local area network (WLAN). The method includes receiving, at first and second access points (APs) in the WLAN, uplink signals from a first client station (STA), which is associated with a basic service set (BSS) of the first AP. First downlink signals are transmitted from the first AP to the first STA using a first steering matrix. Responsively to the received uplink signals, a second steering matrix is computed, having a null in a direction of the first STA. Second downlink signals are transmitted from the second AP to a second STA in the WLAN using the second steering matrix.

In some embodiments, receiving the uplink signals includes transmitting one or more null data packets (NDPs) from both the first AP and the second AP to the first STA, and receiving channel feedback from the first STA in response to the one or more NDPs. In one such embodiment, transmitting the one or more NDPs includes jointly transmitting a null data packet (NDP) to the first STA from both of the first and second APs in mutual synchronization. Additionally or alternatively, transmitting the first downlink signals includes computing, responsively to the channel feedback, the first steering matrix so as to direct the first downlink signals from the first AP to the first STA. In a disclosed embodiment, the method includes transmitting at least one further NDP from both the first AP and the second AP to the second STA, and receiving further channel feedback from the second STA in response to the at least one further NDP, wherein computing the first steering matrix includes creating a null in the first steering matrix responsively to the further channel feedback.

In a disclosed embodiment, transmitting the second downlink signals includes transmitting a downlink packet to the second STA with an instruction to the second STA not to transmit an acknowledgment in response to the downlink packet.

Additionally or alternatively, transmitting the second downlink signals includes transmitting over the WLAN, from the second AP a request-to-send (RTS) packet using the second steering matrix, receiving at the second AP a clear-to-send (CTS) response from the second STA, and following the CTS response, selecting the second STA for transmission of further downlink signals thereto from the second AP using the second steering matrix.

There is also provided, in accordance with an embodiment of the invention, a system for communication over a wireless local area network (WLAN). The system includes first and second access points (APs), which are configured to receive uplink signals from a first client station (STA), which is associated with a basic service set (BSS) of the first AP, wherein the first access point is configured to transmit first downlink signals to the first STA using a first steering matrix, and the second access point is configured to transmit second downlink signals to a second STA using a second steering matrix. At least one processor is configured to compute, responsively to the received uplink signals, at least the second steering matrix such that the second steering matrix has a null in a direction of the first STA.

The present invention will be more fully understood from the following detailed description of the embodiments thereof, taken together with the drawings in which:

DETAILED DESCRIPTION OF EMBODIMENTS

Figure 1:
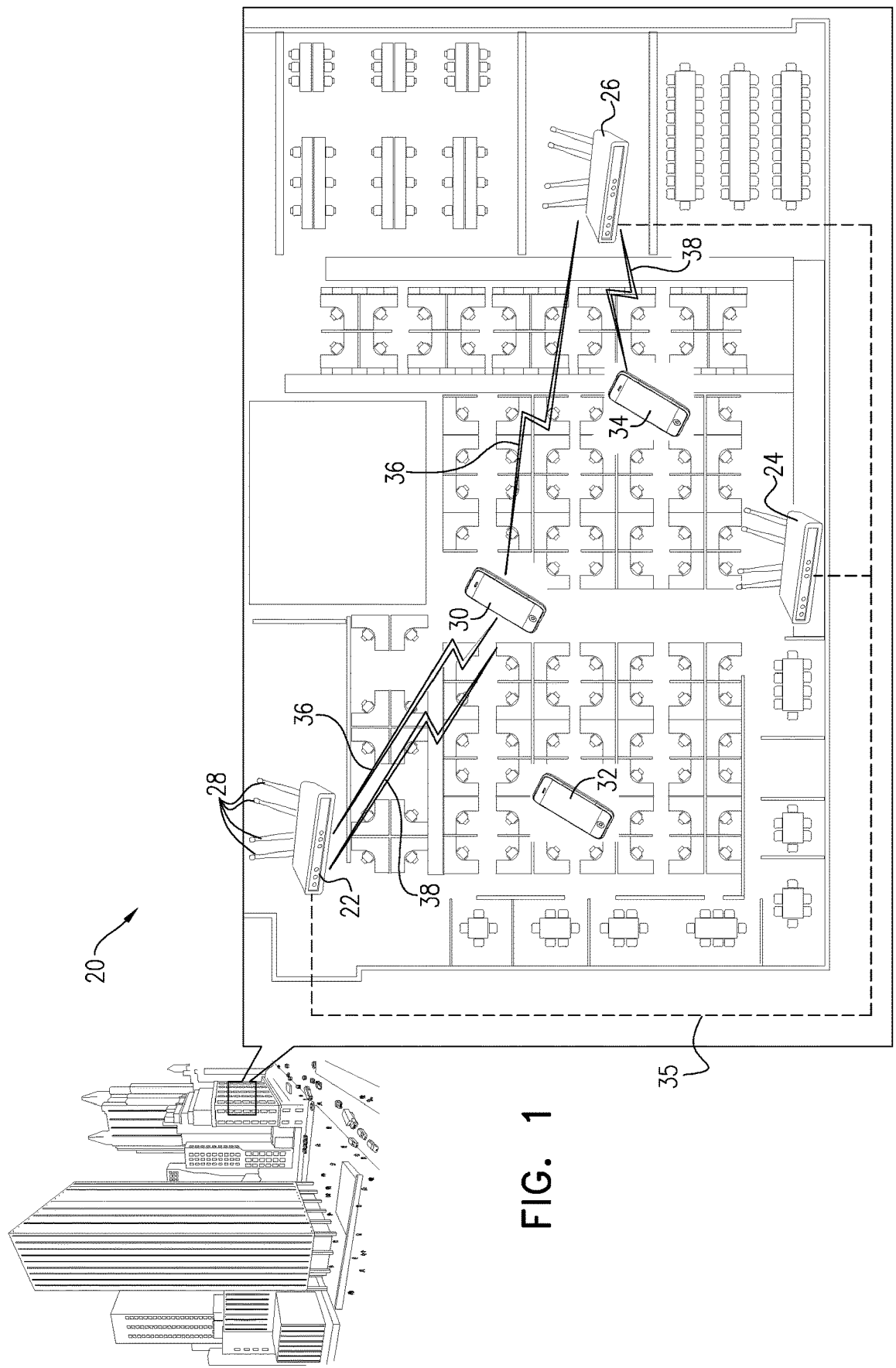
FIG. 1 is schematic pictorial illustration of a wireless network system, in accordance with an embodiment of the invention.

Beamforming technologies, as specified in the IEEE 802.11ax standard, for example, increase the speed and capacity of Wi-Fi® networks. Existing approaches, however, still fail to take full advantage of available spatial resources, and therefore cannot fully address the growing bandwidth needs in crowded wireless network environments, such as large offices and public spaces.

Embodiments of the present invention that are described herein address this problem by enabling access points (APs) in a WLAN to collaborate in defining the beamforming parameters that they will use in serving client stations (STAs). Specifically, in the disclosed embodiments, two (or more) APs cooperatively compute respective beamforming parameters for transmission of directional downlink signals toward a given STA. One of the APs (referred to arbitrarily as the "first AP") can then use its beamforming parameters in actually transmitting downlink signals to the given STA (referred to as the "first STA"). The second AP will use the beamforming parameters in directing its downlink signals away from the first STA and will thus be able to communicate with a second STA in the WLAN simultaneously with the communications between the first AP and the first STA, while avoiding interference. This approach enables denser interleaving of spatial channels in the WLAN, and thus enhances the utilization of the available frequency spectrum.

In the disclosed embodiments, the beamforming parameters are expressed in terms of steering matrices, which are applied to downlink signal vectors transmitted by an AP. These steering matrices define the relative amplitudes and phases of the respective radio frequency (RF) signals that are emitted from the different antennas of the AP, and thus determine the directionality of the combined downlink beam that is transmitted by the AP. Various formalisms may be used in defining the beamforming parameters, and the term "steering matrix," as used in the present description and in the claims, is intended to encompass all such formalisms. For example, the term "precoder" can alternatively be used to refer to a particular digital expression of the steering matrix.

The embodiments of the present invention that are described herein provide a method and system for communication in a WLAN, in which first and second APs receive uplink signals from a first STA, which is associated with a basic service set (BSS) of the first AP. The first AP transmits downlink signals to the first STA using a first steering matrix, which may be directed toward the first STA based on the uplink signals, or may be defined on some other basis (including omni-directional transmission). In response to the received uplink signals, a processor computes a second steering matrix for the second AP, having a null in the direction of the first STA. (The processors used in the beamforming computations are typically deployed in the APs, but alternatively, a separate, centralized processor may perform the computations.) The second AP then transmits downlink signals to a second STA in the WLAN using the second steering matrix, thus preventing interference with the signals transmitted to the first STA.

In some embodiments, the uplink signals comprise channel feedback that the first and second APs receive from the first STA in response to one or more null data packets (NDPs) transmitted from both the first AP and the second AP to the first STA. In one embodiment, the first and second APs transmit a single NDP jointly, in mutual synchronization, so that the first STA will receive the NDP as though it had been transmitted by a single, extended AP. The first STA will then return its channel feedback with respect to the antennas of both the first AP and the second AP.

Alternatively, each AP may transmit its own NDP to the STA independently, in sequence. This latter option alleviates the need for tight synchronization between the APs, though at the expense of lengthening the process of collecting the channel feedback. Further alternatively, the APs may receive uplink signals independently of NDP transmission and without soliciting channel feedback from the STAs; in this case, the steering matrices may be computed using implicit beamforming techniques, for example.

In some embodiments, the first and second APs together transmit one or more NDPs (jointly or sequentially) to the second STA, as well. The steering matrix of the first AP will then be computed so as to create a null in the direction of the second STA.

Figure 2:
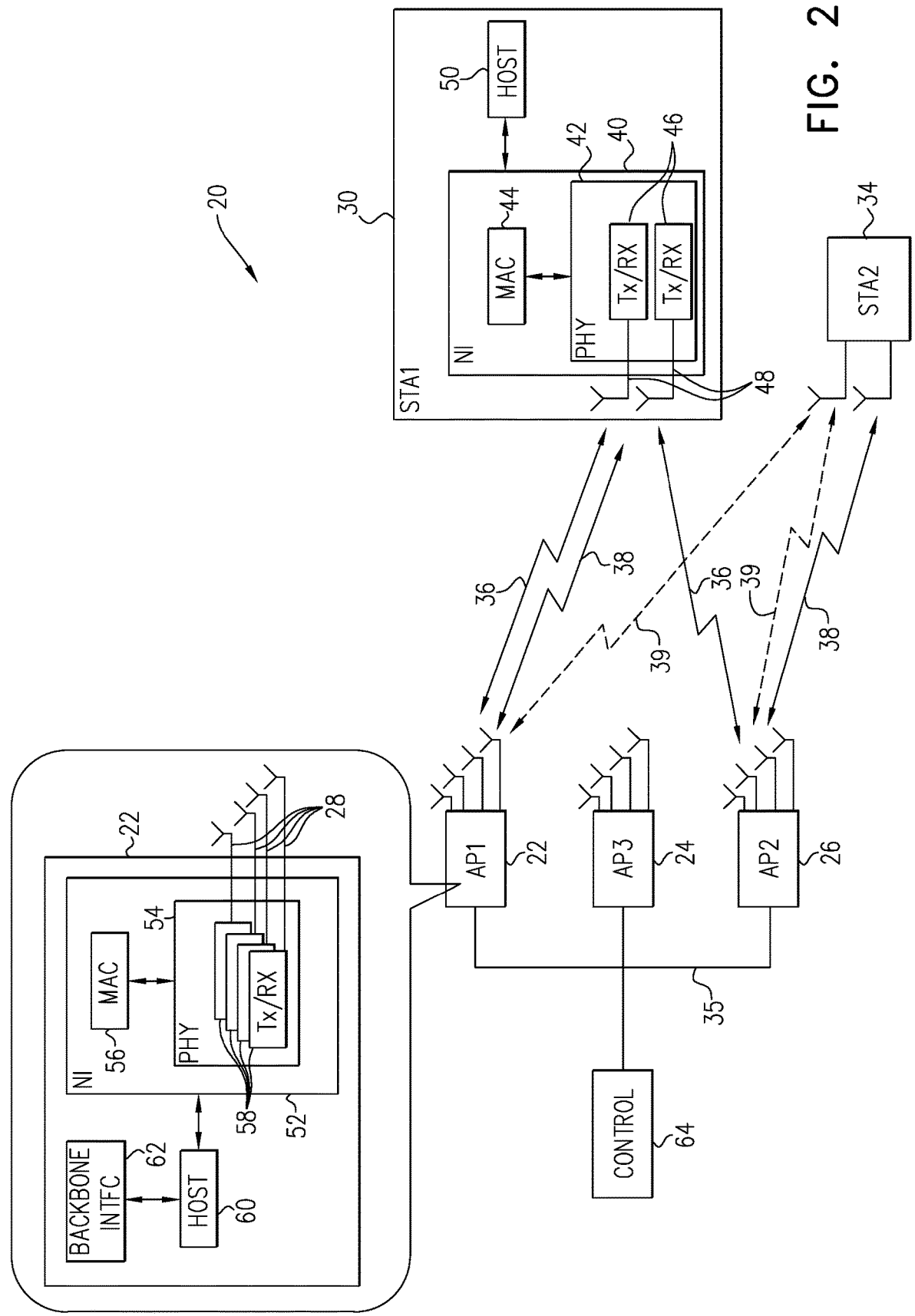
FIG. 2 is a block diagram showing functional components of the system of FIG. 1, in accordance with an embodiment of the invention.

Reference is now made to FIGS. 1 and 2, which schematically illustrate a wireless network system 20, in accordance with an embodiment of the invention. FIG. 1 shows an overview of the operating environment of system 20, while FIG. 2 is a block diagram showing functional components of system 20.

In system 20, APs 22, 24, 26, . . . , having respective arrays of antennas 28, cooperate in serving client STAs 30, 32, 34, . . . (not all shown in FIG. 2, for the sake of simplicity). For purposes of cooperation and synchronization, APs 22, 24, 26, . . . , communicate with one another over a backbone network 35. In the example shown in the figures, STA 30 (labeled STA1 for convenience) receives one or more NDPs from both AP 22 (AP1) and AP 26 (AP2), and returns channel feedback to both AP 22 and AP 26, as indicated by arrows 36. AP 22 then transmits downlink signals to STA 30, while AP 26 transmits downlink signals to STA 34 (labeled STA2). These downlink signals are indicated by arrows 38. AP 22 transmits the downlink signals to STA 30 using any desired steering matrix, for example a steering matrix computed on the basis of the channel feedback from STA 30; while AP 26 transmits the downlink signals to STA 34 using a steering matrix that has a null in the direction of STA 30.

In the details of the embodiment that are illustrated in FIG. 2, AP 22 and AP 26 also transmit one or more NDPs to STA 34 and receive channel feedback in return as indicated by arrows 39. This channel feedback in applied improving the directionality of the downlink signals transmitted from AP 26 toward STA 34, while at the same time nulling the downlink signals from AP 22 in the direction of STA 34.

As shown in FIG. 2, STA 30 comprises a network interface (NI) 40, which comprises PHY and medium access control (MAC) interfaces 42 and 44, in accordance with the IEEE 802.11 specifications. PHY interface 42 comprises one or more radio transceivers 46, which are connected to antennas 48. In the pictured embodiment, PHY interface 42 comprises two such transceivers, each with its own antenna. Alternatively, larger or smaller numbers of transceivers and antennas may be used, with one or more antennas connected to each transceiver. The internal construction of STAs 32 and 34 is typically similar to that of STA 30. In general, the components of PHY and MAC interfaces 42 and 44 are implemented in dedicated or programmable hardware logic circuits, on a single integrated circuit chip or a set of two or more chips.

A host processor 50 passes data to network interface 40 for transmission over the air to target AP receivers, and receives incoming data from network interface 40. Host processor 50 typically comprises a suitable processor or controller, along with a suitable memory and other resources (not shown), and is programmed in software or firmware to carry out various control and communication functions in STA 30. The software may be stored in tangible, non-transitory computer-readable media, such as a suitable RAM or ROM memory. Host processor 50 may be implemented together with the elements of network interface 40 in a single system-on-chip (SoC), or as a separate chip or chip set.

The internal construction of APs 22, 24, 26, . . . , as shown in the inset in FIG. 2, is generally similar to that of STA 30. AP 22 comprises a network interface (NI) 52, which comprises PHY and MAC interfaces 54 and 46, again in accordance with the applicable IEEE 802.11 specifications. PHY interface 54 comprises multiple radio transceivers 58, which are connected to antennas 28. In the pictured embodiment, PHY interface 42 comprises four such transceivers, each with its own antenna. Alternatively, larger or smaller numbers of transceivers and antennas may be used, with one or more antennas connected to each transceiver. In general, the components of PHY and MAC interfaces 54 and 56 are implemented in dedicated or programmable hardware logic circuits, on a single integrated circuit chip or a set of two or more chips.

A host processor 60 passes data to network interface 52 for transmission over the air to target receivers, and receives incoming data from network interface 52. Host processor 60 also communicates with other APs over backbone network 35, using a backbone interface 62, such as an Ethernet interface, a WLAN interface, or a mesh network interface. When backbone network 35 is a wired Ethernet network, for example, backbone interface 62 comprises suitable Ethernet PHY and MAC circuits. Alternatively, backbone interface 62 may comprise a wireless network interface, and may even be integrated with NI 52 when backbone network 35 is integrated into the WLAN. In this case, backbone interface 62 may use the bandwidth of the WLAN in particular time slots (i.e., TDMA) and/or within a particular frequency channel or channels (FDMA).

Host processor 60 typically comprises a programmable processor, along with a suitable memory and other resources (not shown), and is programmed in software or firmware to carry out various control and communication functions in AP 22. These functions typically include channel estimation and computation of steering matrices and other parameters, which are then implemented by NI 52. The software run by host processor 60 is suitably stored in tangible, non-transitory computer-readable media, such as a suitable RAM or ROM memory in various embodiments. Host processor 60 may be implemented together with the elements of network interface 52 and backbone interface 62 in a single system-on-chip (SoC), or as a separate chip or chip set.

A system controller 64, which may be a standalone device or may be integrated in one or more of the APs, is connected to backbone network 35 and coordinates functions such as cooperative channel estimation and beamforming computations among the APs in system 20. Controller 64 may comprise a standalone unit, including a processor executing the required software code and a suitable wired or wireless interface to backbone network 35 (similar to interface 62, as described above). Alternatively or additionally, controller 64 may be embedded as an additional processor in one or more of APs 22, 24, 26, . . . , or as a software process running on host processor 60 of one or more of the APs, or as a distributed process running on multiple APs or all of the APs. All such implementations are considered to be within the scope of the invention, and references to "controller 64" should be understood as encompassing all of these implementation options, unless the context indicates otherwise.

Figure 3:
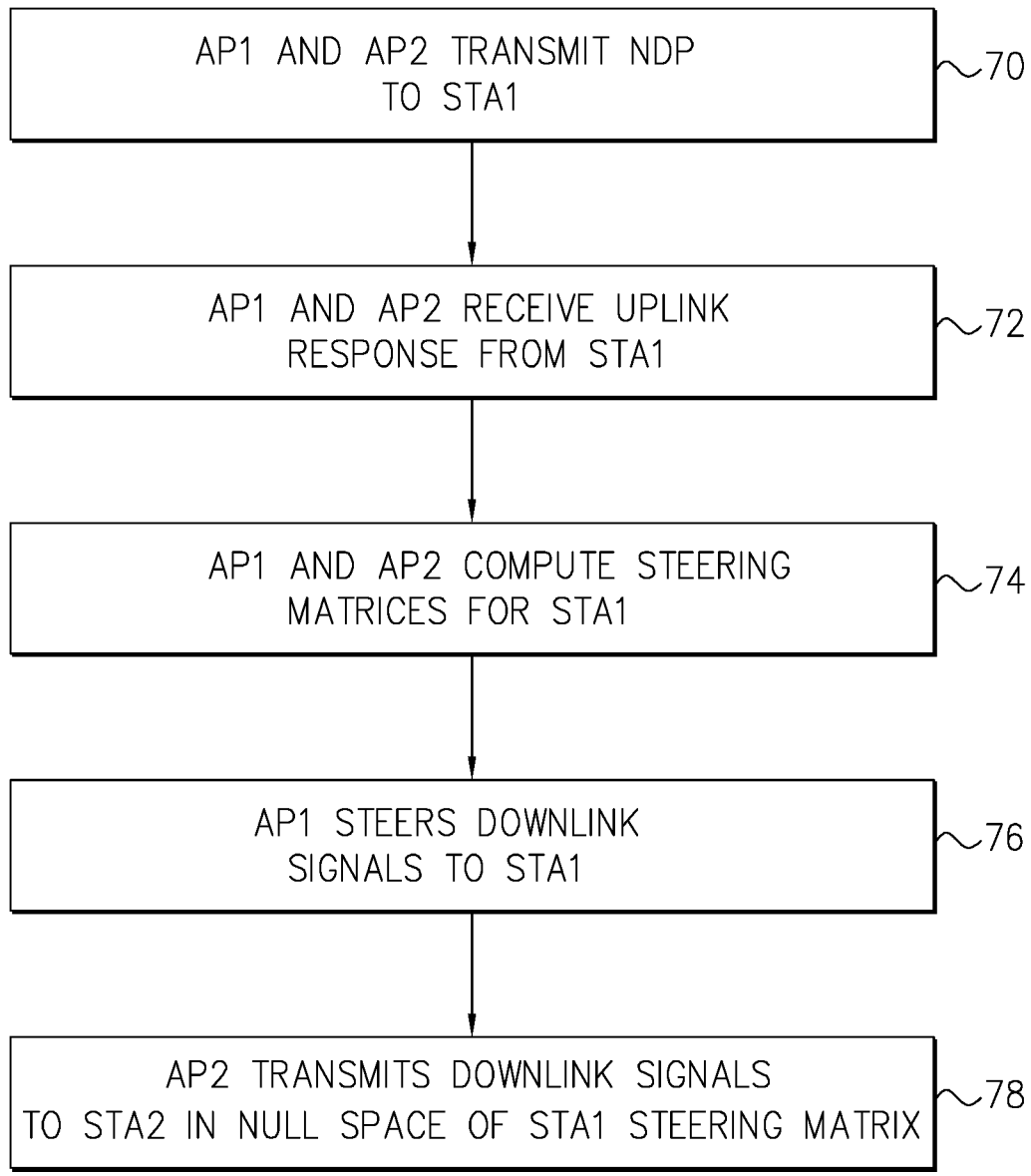
FIG. 3 is a flow chart that schematically illustrates a method for communication in a WLAN, in accordance with an embodiment of the invention.

FIG. 3 is a flow chart that schematically illustrates a method for communication in a WLAN, in accordance with an embodiment of the invention. The method is described here, for the sake of clarity and concreteness, with specific reference to the elements of system 20, as shown in FIGS. 1 and 2 and described above. Alternatively, the principles of this method may be applied, mutatis mutandis, over other sorts of wireless local area networks in which multiple clients are served by interconnected access points. All such alternative implementations are considered to be within the scope of the present invention.

In the method of FIG. 3, AP1 and AP2 initiate communications with STA1 by cooperatively transmitting one or more NDPs to STA1, at an NDP transmission step 70. In one embodiment, AP1 and AP2 send the NDP together, in a single, synchronized transmission, as though the NDP were transmitted from a single, "virtual AP." In the present embodiment, this synchronized transmission makes use of the techniques described in U.S. patent application Ser. No. 16/424,532, filed May 29, 2019, whose disclosure is incorporated herein by reference. In this case, STA1 receives a signal of the following form:

$$y = H_{1,N_r \times N_{t1}} P_{N_{t1} \times N_{LTF}} + H_{2,N_r \times N_{t2}} P_{N_{t2} \times N_{LTF}} + n$$
$$= H_{eff} P_{(N_{t1}+N_{t2}) \times N_{LTF}} + n$$

In this formula, AP1 and AP2 transmit from $N_{t1}$ and $N_{t2}$ numbers of antennas, respectively, to the $N_r$ antennas of STA1. A noise vector n is added to the received signal. The matrices $H_{1,N_r \times N_{t1}}$ and $H_{2,N_r \times N_{t2}}$ represent the channel responses from the antennas of AP1 and AP2, respectively, to the antennas of STA1. $P_{N_{t1} \times N_{LTF}}$ and $P_{N_{t2} \times N_{LTF}}$ are the spatial mapping matrices applied by AP1 and AP2 in transmitting the NDPs, as defined by the IEEE 802.11ax standard, wherein $N_{LTF}$ is the number of long training fields transmitted in the NDPs. (Each such long training field is transmitted from a different antenna.) $P_{N_{t1} \times N_{LTF}}$ and $P_{N_{t2} \times N_{LTF}}$ together make up a unitary P-matrix in which $P_{N_{t1} \times N_{LTF}}$ constitutes the first $N_{t1}$ rows, and $P_{N_{t2} \times N_{LTF}}$ constitutes the subsequent $N_{t2}$ rows of the same P matrix. The composite channel response is $H_{eff} = [H_{1,N_r \times N_{t1}}, H_{2,N_r \times N_{t2}}]$. Alternatively, AP1 and AP2 may each transmit a separate NDP in sequence.

Based on the NDP or NDPs transmitted at step 70, STA1 estimates the channel response $H_{eff}$ and transmits an uplink signal to AP1 and/or AP2 containing channel feedback, at an uplink transmission step 72. The uplink signal at this step is typically (although not necessarily) in the form of a feedback frame, for example as defined in sections 9.4.1.65 and 9.4.1.66 of the IEEE 802.11ax standard. The feedback in this case has the form of a matrix, which STA1 transmits to AP1:

$$V = \begin{bmatrix} V_{1,N_{t1} \times N_r} \\ V_{2,N_{t2} \times N_r} \end{bmatrix}$$

Alternatively, if AP1 and AP2 transmit separate NDPs at step 70, STA1 will transmit the feedback matrices $V_{1,N_{t1} \times N_r}$ and $V_{2,N_{t2} \times N_r}$ separately to AP1 and AP2, respectively at step 72. In an alternative embodiment, AP1 and AP2 also transmit one or more NDPs at step 70 to STA2, and thus receive channel feedback of the above form from STA2, as well, at step 72.

Based on the channel feedback matrix or matrices received at step 72, AP1 and AP2 compute respective steering matrices for STA1, at a steering computation step 74. This computation may be carried out separately by host processor 60 in each of the access points; or it may be performed for both APs by a single processor, such as controller 64 (FIG. 2). The steering matrix for AP1 is $Q_{1,N_{t1} \times N_{SS1}}$, as defined in the IEEE 802.11ax standard, wherein $N_{SSj}$ is the number of spatial streams transmitted by APj (j=1,2). The steering matrix for AP2 is computed so as to satisfy the nulling condition:

$$Q_{2,N_{t2} \times N_{SS2}} = V \frac{1}{2} \times A_{(N_{t2}-N_r) \times N_{SS2}},$$

wherein A is any suitable matrix, meaning that the steering matrix is orthogonal to the channel response $H_{2,N_r \times N_{t2}}$. (For example, A could be a beamforming matrix for transmission to STA2. $Q_{2,N_{t2} \times N_{SS2}}$ should be in the span of $V_2^{\perp}$.) Consequently, the steering matrix $Q_{2,N_{t2} \times N_{SS2}}$ will have a null in the direction of STA1. The values of $N_{SSj}$ depend on the numbers of antennas, subject to the conditions that $N_{SS1} \leq \min(N_r, N_{t1})$, and $N_{SS2} \leq \min(N_{r2}, N_{t2}, N_{t2}-N_r)$, wherein $N_r$ is the number of antennas available on STA1, while $N_{r2}$ is the number of antennas available on STA2. If channel feedback was also received from STA2 at step 72, then the steering matrix $Q_{1,N_{t1}} \times N_{SS1}$ for AP1 can be computed at step 74 so that it is orthogonal to the channel response from AP1 to STA2.

AP1 transmits downlink signals to STA1, at a first downlink transmission step 76. This transmission typically uses the steering matrix $Q_{1,N_{t1} \times N_{SS1}}$ for directional transmission to STA1, although alternatively, an omni-directional or other steering matrix may be used. AP2 simultaneously transmits downlink signals to STA2 at a second downlink transmission step 78, using the steering matrix $Q_{2,N_{t2} \times N_{SS2}}$ with a null in the direction of STA1, at a second downlink transmission step 78. (The terms "first" and "second" in regard to steps 76 and 78 are used here arbitrarily, since these steps can occur simultaneously.) The signal received by STA1 will then have the form:

$$y = H_{1,N_r \times N_{t1}} Q_{1,N_{t1} \times N_{SS1}} x_{N_{SS1} \times 1} + H_{2,N_r \times N_{t2}} Q_{2,N_{t2} \times N_{SS2}} x_{N_{SS2} \times 1} + n$$

$$= H_{1,N_r \times N_{t1}} Q_{1,N_{t1} \times N_{SS1}} x_{N_{SS1} \times 1} + I + n$$

Here $x_{N_{SS1} \times 1}$ and $x_{N_{SS2} \times 1}$ are the downlink signal vectors transmitted by AP1 and AP2, respectively. Assuming $Q_{2,N_{t2} \times N_{SS2}}$ to be orthogonal to the channel response $H_{2,N_r \times N_{t2}}$, as explained above, the interference term I in the above formula will be zero. If $Q_{1,N_{t1} \times N_{SS1}}$ likewise has a null in the direction of STA2, then STA2 will similarly experience no interference from AP.

In some embodiments, as noted earlier, the steering matrix $Q_{1,N_{t1} \times N_{SS1}}$ that is computed and applied by AP1 at step 76 will have a null in the direction of STA2. Even if this condition is not satisfied, however, AP2 may transmit downlink signals to STA2 at step 78 using the steering matrix $Q_{2,N_{t2}} \times N_{SS2}$, regardless of the steering matrix applied by AP1. In this case, in order to avoid uplink interference, the downlink packets transmitted by AP2 at step 78 typically include an instruction to STA2 not to transmit an acknowledgment in response to the downlink packet. Such an instruction can by invoked, for example, by using the BlockAckReq frame format that is defined in section 9.3.1.8 of the IEEE Std 802.11™-2016 specification.

Additionally or alternatively, AP2 uses a request-to-send (RTS) packet in selecting the STA (for example STA2) to which it will transmit further downlink signals at step 78. The RTS mechanism is used in this case to verify that STA2 is not subject to substantial interference from AP1. Thus, AP2 transmits an RTS packet at step 78 using the steering matrix $Q_{2,N_{t2} \times N_{SS2}}$ (with a null in the direction of STA1). Assuming STA2 does not receive the downlink signal transmitted by AP1 at step 76, it will immediately return a clear-to-send (CTS) response to AP2. (If STA2, or any other STA in system 20, detects the downlink signal from AP1, it will not return a CTS response.) Thus, following the CTS response, AP2 will continue transmitting data to STA2 (or to whichever STA returned the CTS response), using the steering matrix $Q_{2,N_{t2} \times N_{SS2}}$.

It is noted that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for communication in a wireless local area network (WLAN), the method comprising:
   receiving, at first and second access points (APs) in the WLAN, uplink signals from a first client station (STA), which is associated with a basic service set (BSS) of the first AP;
   transmitting first downlink signals from the first AP to the first STA using a first steering matrix;
   computing, responsively to the received uplink signals, a second steering matrix having a null in a direction of the first STA;
   transmitting second downlink signals from the second AP to a second STA in the WLAN using the second steering matrix; and
   transmitting at least one null data packet (NDP) from both the first AP and the second AP to the second STA, and receiving channel feedback from the second STA in response to the at least one NDP, wherein a null is created in the first steering matrix responsively to the channel feedback.

2. The method according to claim 1, wherein receiving the uplink signals comprises transmitting one or more further null data packets (NDPs) from both the first AP and the second AP to the first STA, and receiving further channel feedback from the first STA in response to the one or more further NDPs.

3. The method according to claim 2, wherein transmitting the one or more further NDPs comprises jointly transmitting a null data packet (NDP) to the first STA from both of the first and second APs in mutual synchronization.

4. The method according to claim 2, wherein transmitting the first downlink signals comprises computing, responsively to the further channel feedback, the first steering matrix so as to direct the first downlink signals from the first AP to the first STA.

5. The method according to claim 1, wherein transmitting the second downlink signals comprises transmitting a downlink packet to the second STA with an instruction to the second STA not to transmit an acknowledgment in response to the downlink packet.

6. The method according to claim 1, wherein transmitting the second downlink signals comprises transmitting over the WLAN, from the second AP a request-to-send (RTS) packet using the second steering matrix, receiving at the second AP a clear-to-send (CTS) response from the second STA, and following the CTS response, selecting the second STA for transmission of further downlink signals thereto from the second AP using the second steering matrix.

7. A system for communication over a wireless local area network (WLAN), the system comprising:
   first and second access points (APs), which are configured to receive uplink signals from a first client station (STA), which is associated with a basic service set (BSS) of the first AP, wherein the first access point is configured to transmit first downlink signals to the first STA using a first steering matrix, and the second access point is configured to transmit second downlink signals to a second STA using a second steering matrix; and
   at least one processor, which is configured to compute, responsively to the received uplink signals, at least the second steering matrix such that the second steering matrix has a null in a direction of the first STA;
   wherein both the first AP and the second AP are configured to transmit at least one NDP to the second STA, and to receive channel feedback from the second STA in response to the at least one NDP, wherein the at least one processor is configured to create a null in the first steering matrix responsively to the channel feedback.

8. The system according to claim 7, wherein the first and second APs are configured to transmit one or more further null data packets (NDPs) from both the first AP and the second AP to the first STA, and to receive further channel feedback from the first STA in response to the one or more NDPs, wherein the at least one processor is configured to compute the second steering matrix based on the further channel feedback.

9. The system according to claim 8, wherein the first and second STAs are configured to jointly transmit a null data packet (NDP) to the first STA from both of the first and second APs in mutual synchronization.

10. The system according to claim 8, wherein the at least one processor is configured to compute the first steering matrix responsively to the further channel feedback so as to direct the first downlink signals from the first AP to the first STA.

11. The system according to claim 7, wherein the second AP is configured to transmit a downlink packet to the second STA, using the second steering matrix, with an instruction to the second STA not to transmit an acknowledgment in response to the downlink packet.

12. The system according to claim 7, wherein the second AP is configured to transmit over the WLAN a request-to-send (RTS) packet using the second steering matrix, to receive a clear-to-send (CTS) response from the second STA, and following the CTS response, to select the second STA for transmission of further downlink signals thereto from the second AP using the second steering matrix.

* * * * *